United States Patent [19]

Hino et al.

[11] Patent Number: 4,737,974

[45] Date of Patent: Apr. 12, 1988

[54] INVERTER TYPE SWITCHING POWER SUPPLY WITH TRANSFORMER AND SHORT CIRCUIT ARRANGEMENT THEREFOR

[76] Inventors: Hirofumi Hino, 1708-1, Funado, Kashiwa-shi; Masaji Ohtakeguchi, 4-11, Sennaricho-2-chome, Toyonaka-shi; Norikazu Tokunaga, 15-10, Higashionumacho-2-chome, Hitachi-shi; Kazuo Kaneko, 38-4, Marugasakicho, Omiya-shi, all of Japan

[21] Appl. No.: 691,126

[22] Filed: Jan. 14, 1985

[30] Foreign Application Priority Data

Jan. 17, 1984 [JP] Japan .................... 59-4711

[51] Int. Cl.$^4$ .................... H05G 1/12; H05G 1/20
[52] U.S. Cl. .................... 378/105; 363/17; 378/104
[58] Field of Search .............. 378/101, 104, 105, 107; 363/17, 24, 41

[56] References Cited

U.S. PATENT DOCUMENTS 4,424,557  1/1984  Steigerwald .................... 363/41
4,504,895  3/1985  Steigerwald .................... 378/105

OTHER PUBLICATIONS

"Application of Power Transistors to Residential and Intermediate Rating Photovoltaic Array Power Conditions"—Steigerwald et al., IEEE Transactions on Industry Applications, vol. 1A-19, No. 2, Mar./Apr. 1983, pp. 255-267.

Primary Examiner—Craig E. Church
Attorney, Agent, or Firm—Antonelli, Terry & Wands

[57] ABSTRACT

An inverter-type switching power supply circuit which comprises an inverter for converting the DC output of a DC power source to an AC output, a transformer for receiving the AC output of the inverter, a rectifier for rectifying the output of the transformer, a smoothing capacitor for smoothing the output of the rectifier and supplying it to a load, and a transformer short-circuiting circuit for short-circuiting either the primary side or the secondary side of the transformer. The transformer is frequency controlled such that the product of the applied voltage and time of the transformer becomes constant. Thus, the transformer can be designed to have a small size and a light weight.

9 Claims, 5 Drawing Sheets

FIG. I
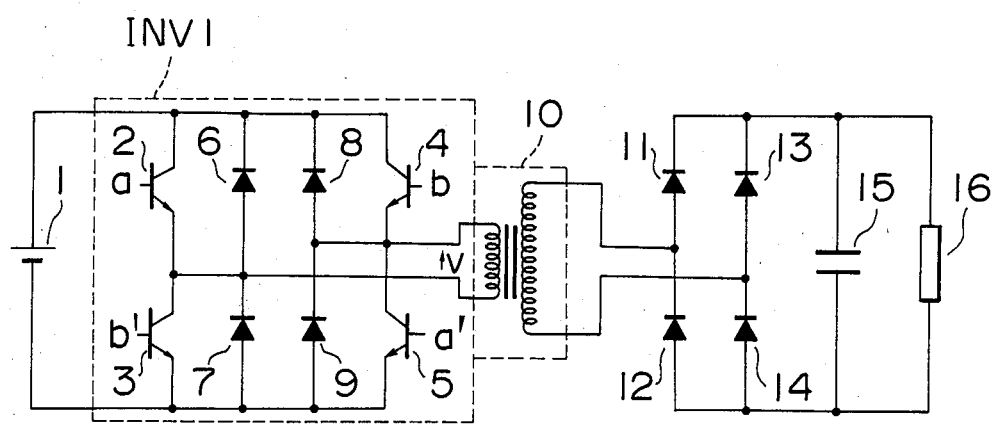
FIG. 2
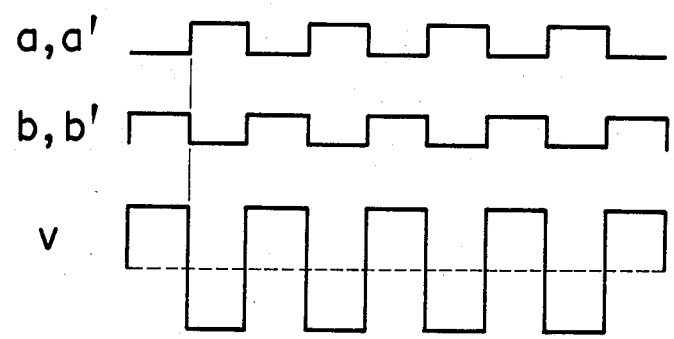

INVERTER TYPE SWITCHING POWER SUPPLY WITH TRANSFORMER AND SHORT CIRCUIT ARRANGEMENT THEREFOR

BACKGROUND OF THE INVENTION

This invention relates to an inverter type switching power supply circuit suitable for making a transformer connected to the output side of an inverter small and light.

One example of the inverter type switching power supply circuit is shown in FIG. 1. In this figure, numeral 1 denotes a DC power source, 2 to 5 denote switching elements; here NPN type transistors which are turned on by base currents a, a', b and b' flowing in the bases thereof are used, and 6 to 9 denote diodes. In this case, each of pairs of a pair of the transistors 2 and 3 and a pair of the transistors 4 and 5 is connected between the positive and negative polarity terminals of the DC power source 1 with the transistors in each pair being connected in series with one another and with the direction of each of the transistors 2 to 5 having the same relationship in terms of the collector-emitter position with respect to the polarity of the DC power source 1. The diode 6 to 9 are connected in parallel with the transistors 2 to 5, respectively, i.e., each diode is connected between the collector and emitter of and in the polarity opposite to that of the associated transistor, in order that no reverse bias is applied to the transistors. The transistors 2 to 5 and the diodes 6 to 9 constitute an inverter INV1 of full-bridge type.

Numeral 10 denotes a transformer whose primary winding is connected to the output terminals of the above-mentioned inverter INV1 i.e., between the connecting point of the transistors 2 and 3 and the connecting point of the transistors 4 and 5. 11 to 14 are diodes which rectify the output voltage of the transformer 10, 15 is a smoothing capacitor for smoothing the rectified output of the diodes 11 to 14, and 16 is a load such as an X-ray tube a resistor or the like.

Next, the operation of the circuit of FIG. 4 will be explained with reference to FIG. 2. Now, we assume that the base currents a, a' of the transistors 2, 3 and the base currents b, b' of the transistors 3, 4 flow alternately as shown in FIG. 2 and that the transistors 2, 5 and the transistors 3, 4 are turned on alternately. In this case, when the transistors 2, 5 are turned on, a current flows in the path of the positive polarity terminal of the DC power source 1→transistor 2→primary winding of the transformer 10→transistor 5→negative polarity terminal of the DC power source 1. When the transistors 3, 4 are turned on, a current flows in the path of the positive polarity terminal of the DC power source 1→transistor 4→primary winding of the transformer 10→transistor 3→negative polarity terminal of the DC power source 1. Thus, the voltage v applied across the primary winding of the transformer 10 is transformed into an AC voltage as shown in FIG. 2. This voltage v is stepped up to a prescribed voltage, supplied from the secondary windings of the transformer 10 to the diodes 11 to 14 to thereby be rectified, smoothed by the capacitor 15 and supplied to the load 16.

As one method of adjusting the output voltage of such an inverter type switching power supply circuit, there has been a method known as the frequency control method wherein the on-time of the inverter INV1 is kept constant, while the off-time thereof is varied. The name of this method comes from the fact that, according to this method, the frequency of occurrence of the on-state varies. When the base currents a, a', b and b' as shown in FIG. 3 are made to flow through the transistors 2, 5 and the transistors 3, 4, the output voltage decreases and the power supplied to the load 16 per unit time becomes smaller as compared with the case shown in FIG. 2.

In the mean time, the magnetic flux density B of the transformer 10 is represented by $$B=(V \cdot t)/(n \cdot S) \tag{1}$$

where, V represents the applied voltage, t duration of the applied voltage, n number of turns of the winding, S the cross-section area of the iron core. From the equation, it should be known that B increases with V and t under the condition of n and S being constant, and when the B exceeds a predetermined value of B, the iron core saturates magnetically and an excessive excitation current flows. It sometimes destroys the transistors 2 to 5.

In the case of the above-mentioned frequency control where the on-time of the inverter INV1 is kept constant while the off-time thereof is varied, it has been considered that the voltage applied to the transformer 10 has a waveform such as a waveform v indicated by the solid line in FIG. 3, and accordingly, that the V−t product can be kept constant.

However, in reality, the voltage actually applied to the transformer 10 is as shown by a broken line v in FIG. 3. This is due to the influence of the electric charge stored in the stray capacitance of the transformer 10. Due to this voltage, the product of applied voltage and time (V·t) becomes larger as compared with the case where the voltage is applied to the transformer 10 only in the on-period of the inverter INV1. Thus, the iron core magnetically saturates.

In order that the iron core does not saturate even if the voltage as shown by the broken line v in FIG. 3 is applied to the transformer 10, it is effective from the equation (1) to increase n or S. An increase in n or S, however, makes the transformer 10 large and heavy. An improvement has been desired in this respect.

SUMMARY OF THE INVENTION

This invention is intended to solve the above problem. An object of this invention is to provide an inverter type switching power supply circuit where it is designed to make the transformer small and light by keeping the product of applied voltage and time of the transformer constant even if the inverter is frequency controlled.

According to one aspect of this invention, an inverter type switching power source comprises an inverter which converts the DC voltage from a DC power source to an AC voltage, a transformer to which the AC output of the inverter is supplied, a rectifier which rectifies the output voltage of the transformer, a smoothing capacitor which smooths the output of the rectifier and supplies it to a load and a transformer short-circuiting means for short-circuiting either one of the primary and secondary windings of the transformers in the off-period of the inverter. The electric charge stored in a stray capacitance of the transformer is discharged in the off-time duration of the inverter so that no voltage is applied to the transformer except in the on-period of the inverter.

BRIEF DESCRIPTION OF THE DRAWINGS

FIG. 1 is a diagram showing one example of an inverter type switching power supply circuit.

FIGS. 2 and 3 are time charts for explaining the operation of the above circuit.

DESCRIPTION OF THE PREFERRED EMBODIMENTS

Figure 4A:
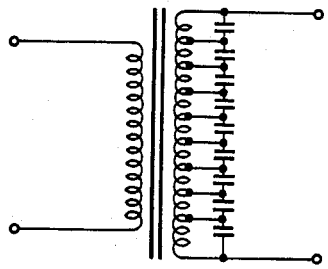
FIGS. 4A and 4B are circuit diagrams for explaining the stray capacitance of the transformer in FIG. 1.
Figure 4B:
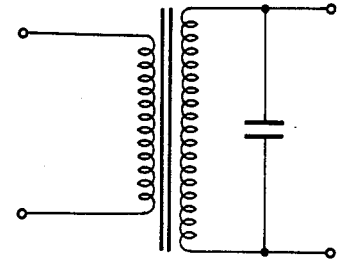
Figure 5:
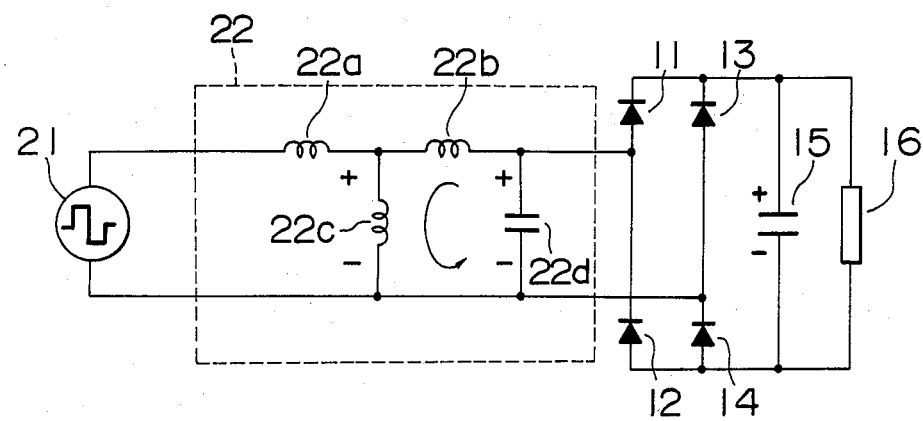
FIG. 5 is an equivalent circuit of the circuit shown in FIG. 1.

Before explaining specific embodiments of this invention, the principle will be explained. In the inverter type switching power supply circuit, even if the frequency control with the fixed on-period of the inverter is performed, a voltage is still applied to the transformer in the off-period of the inverter and the product of applied voltage and time of the transformer increases. The reason is as follows. Generally, the windings of the transformer are wound rarely in a single layer. Specifically, when the transformation ratio is large, the number of coil layers increases. A stray capacitance exists between the layers as shown in FIG. 4A. The equivalent circuit of the stray capacitances may be expressed as shown in FIG. 4B. The equivalent circuit of the circuit of FIG. 1 is as shown in FIG. 5. In FIG. 5, 21 denotes an equivalent circuit of a frequency variable AC power sourc made up of the DC power source and the inverter. 22 is a transformer expressed by its equivalent circuit; 22a and 22b leakage inductances of the transformer 22, 22c the excitation inductance, 22d the stray capacitance. 11 to 16 represent the same elements as those shown in FIG. 1.

Figure 3:
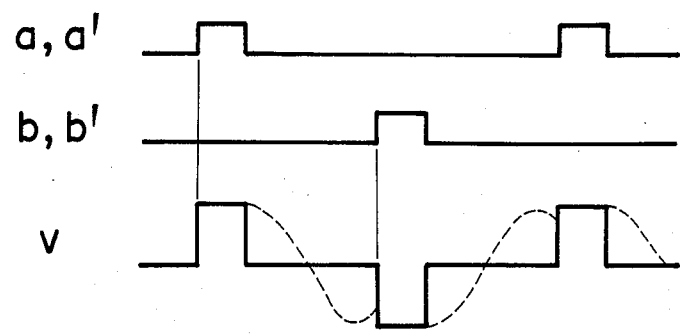

In the circuit shown in FIG. 5, when a voltage having the polarity shown in the figure is applied from the AC power source 21 to the excitation inductance 22c the stray capacitance 22d and the smoothing capacitor 15 are charged in the polarities as shown in the figure. Even if the applied voltage from the AC power source 21 becomes zero later, the stray capacitance remains in the charged state. Therefore, a voltage is kept to be applied to the transformer 22. Then, the electric charge in the stray capacitance 22d begins to be discharged in the path of the leakage inductance 22b→excitation inductance 22c→stray capacitance 22d. In this path, the excitation inductance 22c has a large inductance value so that the oscillation period determined by the stray capacitance 22d becomes long. As a result, a voltage shown by v in the broken line in FIG. 3 is applied to the transformer 22.

Therefore, in this invention, the electric charge stored in the stray capacitance 22d is made to be discharged in the off-period of the inverter so that no voltage is applied to the transformer except in the on-period of the inverter.

Figure 6:
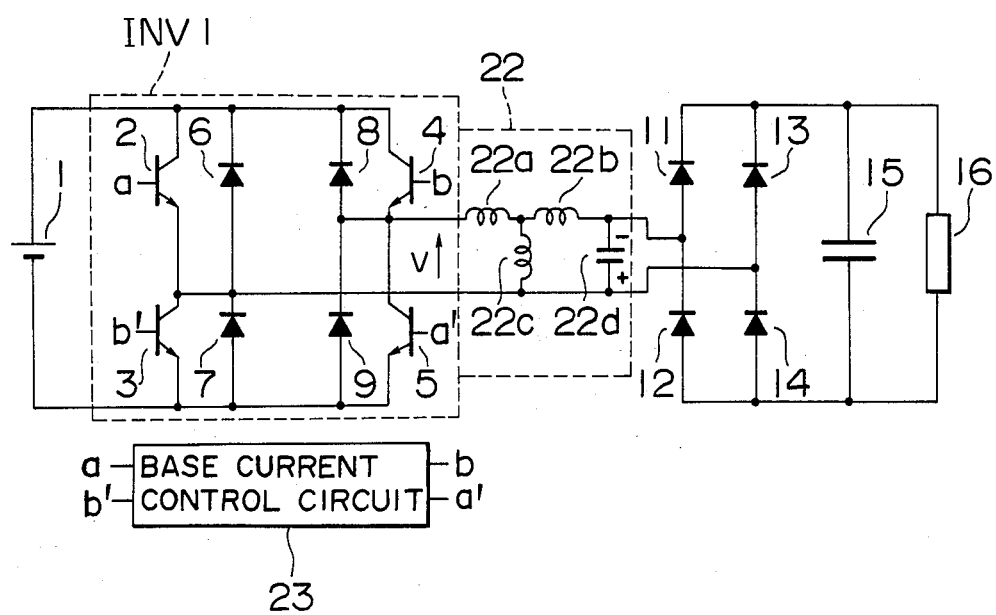
FIG. 6 is a diagram showing one embodiment of an inverter type switching power supply circuit according to this invention.
Figure 9:
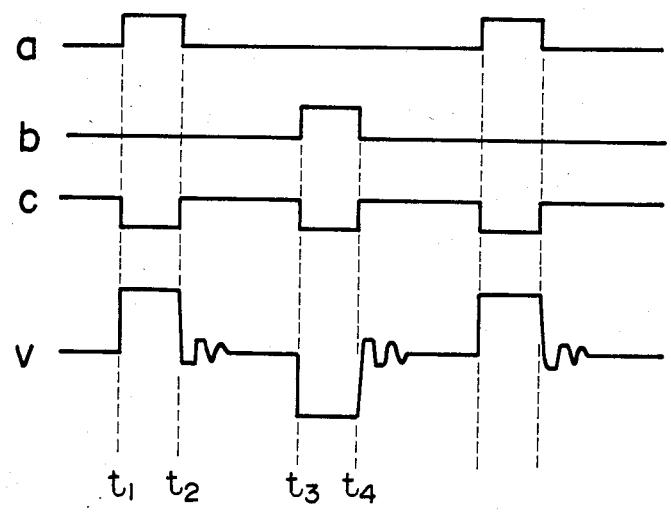
FIG. 9 is a time chart for explaining the operation of the circuit of FIG. 8.

Embodiments of this invention will be explained hereinafter with reference to FIG. 6 and FIG. 9. FIG. 6 shows one embodiment of an inverter type switching circuit according to this invention, where the same reference numerals are used to denote the same or like parts as those in FIGS. 1 and 5. 23 denotes a base current control circuit which has a means for short-circuiting the primary or the secondary side, here the primary side, of the transformer 22 in the off-period of the inverter INV1 to control the base currents a, a', b, and b' of the transistors 2 to 5.

Figure 7:
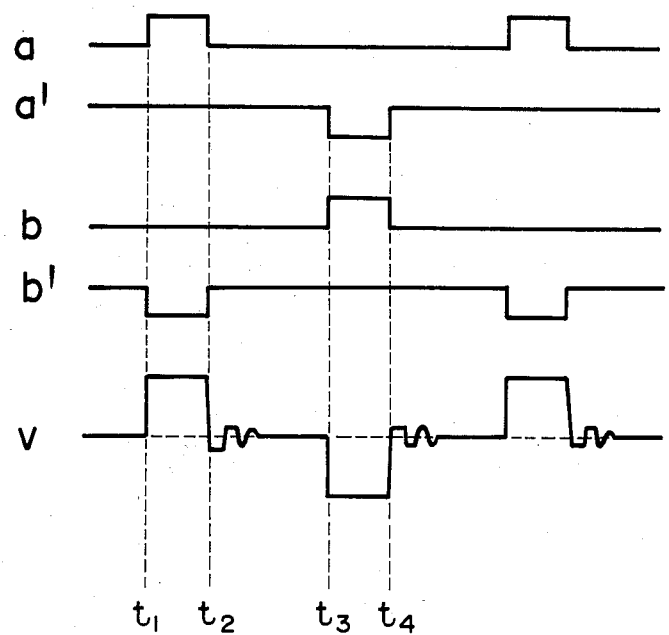
FIG. 7 is a time chart for explaining the operation of the circuit of FIG. 6.

Next, the operation of the above-mentioned circuit of this invention will be explained with aid of FIG. 7. Due to the control circuit 23, the base current a' of the transistor 5 has been already flowing when the base current a of the transistor 2 begins to flow. However, since the transistor 2 is not turned on before the base current a flows, the voltage applied to the transformer 22 is zero. When the base current a begins to flow at a time $t_1$, the transistor 2 is turned on and a current flows in the path of the positive polarity terminal of the DC power source 1→transistor 2→excitation inductance 22c of the transformer 22→the leakage inductance 22a of the transformer→transistor 5→negative polarity terminal of the DC power source. The voltage v is applied to the transformer 22 and a power is supplied to the load 16. At this time, the stray capacitance 22d is charged with a polarity as shown in the figure.

In order to turn off the inverter INV1 at a time $t_2$, only the base current a of the transistor 2 is cut off. When the transistor 2 is made off, the circuit comprising the positive polarity terminal of the above-mentioned DC power source 1→transistor 2→excitation inductance 22c of the transformer 22→leakage inductance 22a of the transformer→transistor 5→the negative polarity terminal of the above-mentioned DC power source 1 is opened. Power supply to the load 16 is thus stopped. At the time $t_2$, the base current b' is made to flow. Then, the electric charge stored in the stray capacitance 22d starts to oscillate in the path of the stray capacitance→transistor 3→diode 9→leakage inductance 22a of the transformer 22→leakage inductance 22b of the transformer→stray capacitance 22d. When the stray capacitance 22d is reversely charged, the transistor 5 is kept on, since the base current a' continues to flow. Therefore, oscillation occurs in the path of the stray capacitance 22d→leakage inductance 22b of the transformer 22→leakage inductance 22a of the transformer→transistor 5→diode 7→stray capacitance 22d. The oscillation period is determined mainly by the resonance frequency of the stray capacitance 22d of the transformer 22 and the leakage inductances 22a and 22b. However, since the leakage inductances 22a and 22b are much smaller than the excitation inductance 22c; the oscillation period is short. Furthermore, the oscillation is attenuated by a resistive component of the circuit and a waveform as shown by v in FIG. 7 is obtained.

Next, in order to apply a voltage v with a reverse polarity to the transfor,mer 22, the transistor 4 is made on at a time $t_3$. For this purpose, the base current b is made to flow but in order to turn off the transistor 5 prior to this the base current a' is cut off. When the base current b is made to flow, the transistor 4 is turned on. Since the base current b' is already flowing and the transistor 3 is turned on, a current flows in the path of the positive polarity terminal of the DC power source 1→transistor 4→leakage inductance 22a of the transformer 22→excitation inductance 22c of the transformer→transistor 3→negative polarity terminal of the DC power source 1. Therefore, a voltage v applied to the transformer 22 has a polarity opposite to that in the previous case where the base currents a and a' were made to flow and a power is supplied to the load 16. In this case, the stray capacitance 22d is charged with a polarity opposite to that shown in the figure.

In order to turn the inverter INV1 off at a time $t_4$, only the base current b is cut off to make the transistor off. Then, the above-mentioned current path is opened and the power supply to the load 16 is stopped. Simultaneously, in order to discharge the electric charge in the stray capacitance 22d the base current a' is made to flow and the transistor 5 is turned on. Thus, a closed path of the stray capacitance 22d→leakage inductance 22b of the transformer 22→leakage inductance 22a of the transformer→transistor 5→diode 7→stray capacitance 22d and a closed path from the stray capacitance 22d→transistor 3→diode 9→leakage inductance 22a of the transformer 22→leakage inductance 22b of the transformer→stray capacitance 22d are formed. The electric charge in the stray capacitance 22d causes a damped oscillation in these closed circuits and becomes zero.

As described above, in the above embodiment, the primary winding of the transformer 22 is short-circuited by turning the transistors 3 and 5 of the inverter INV1 on in the off-period of the inverter INV1, whereby the residual electric charge in the stray capacitance 22d of the transformer 22 is forced to make a damped oscillation. Therefore, such a waveform as shown by the broken line v in FIG. 3 is not applied to the transformer in the off-period of the inverter INV1. The product of applied voltage and time of the transformer 22 becomes constant. Thus, the transformer 22 can be made small and light.

Figure 8:
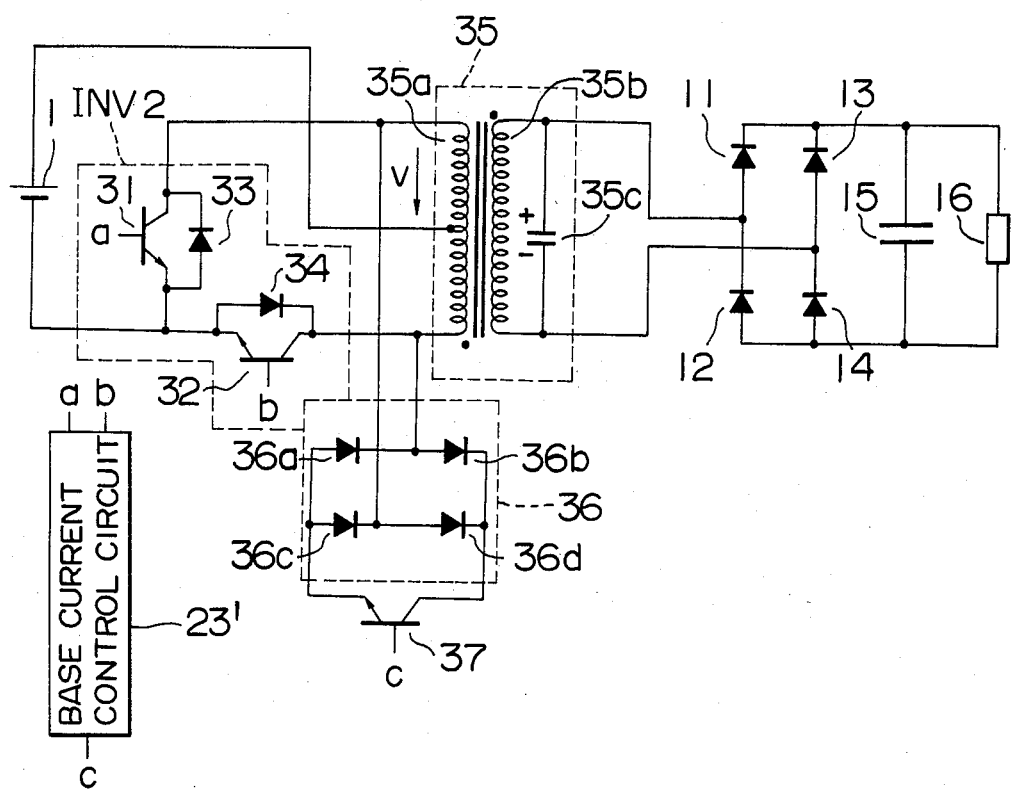
FIG. 8 is a diagram showing another embodiment of the circuit according to this invention.

FIG. 8 is a diagram showing another embodiment of the inventive circuit. In FIG. 8, the same reference numerals are used to denote the same or like parts as shown in FIG. 6. 31 and 32 are switching elements; here NPN transistors which are turned on by flowing the base currents a and b are used. 33 and 34 are diodes which are connected between the collector and emitter of each of the transistors 31 and 32 in parallel with and in the opposite polarity to those of them in order not to apply any reverse voltage to these transistors. A push-pull type inverter INV2 is constituted by these transistors and diodes. 35 is a transformer whose primary winding 35a has a center tap; here a high voltage transformer, 35b denotes the secondary winding and 35c the stray capacitance of the transformer 35. Dots denote the same polarity. In this case, the both ends of the primary winding 35a are connected to the negative electrode of the DC power source 1, the one end through the collector and the emitter of the transistor 31 while the other end through the collector and the emitter of the transistor 32. The center tap is connected to the positive electrode of the DC power source 1.

36 denotes a full-wave rectifying circuit inserted between the both ends of the primary winding 35a of the transformer 35, and constituted by diodes 36a to 36d. 37 is a switching element; here an NPN transistor which short-circuits the DC side of the rectifying circuit 36 by flowing the base current c is used. The full-wave rectifying circuit 36 and the switch element 37 form an AC switch arrangement. The outputs a, b, and c of the base current control circuit 23' are connected to the base of the switching elements 31, 32 and 37, respectively.

Next, the operation of the above-mentioned circuit of this invention will be explained hereinafter with reference to FIG. 9. When the transistor 31 or 32 is turned off by the control circuit 23', the base current c is made to flow to make the transistor 37 on. At a time $t_1$, the base current a is made to flow to turn the transistor 31 on. At this time, the base current c is cut off to make the transistor 37 off. Then, a current flows in a path of the positive polarity terminal of the DC power source 1→primary winding 35a of the transformer 35→ transistor 31→negative polarity terminal of the DC power source 1. A voltage v is applied to the primary winding 35a of the transformer 35 which winding is positive at the dotted end and a power is supplied to the load 16.

In order to make the inverter INV2 off at a time $t_2$, the base current a is cut off to turn the transistor 31 off. Then, a circuit consisting of the positive polarity terminal of the above-mentioned DC power source 1→primary winding 35a of the transformer 35→transistor 31→negative polarity terminal of the DC power source 1 opens and the power supply to the load 16 is stopped. At this time, since the stray capacitance 35c is charged with the polarity as shown in the figure, the base current c is made to flow at the time $t_2$ to turn the transistor 37 on. As a result, a closed circuit of the primary winding 35a→diode 36b→transistor 37→diode 36c→primary winding 35a is formed and the electric charge in the stray capacitance 35c starts to oscillate. This oscillation is due to the stray capacitance 35c and the leakage inductance of the transformer 35. Since the leakage inductance is usually small, the oscillation period becomes short. Furthermore, the oscillation is attenuated by the resistance in the circuit and a waveform as shown by v in FIG. 9 is obtained.

As in the case where the transistor 31 is made on, the transistor 32 is made on by flowing the base current b at a time $t_3$, when the transistor 37 is turned off. Then, a current flows in a path of the positive polarity terminal of the DC power source 1→primary winding 35a of the transformer 35→transistor 32→negative polarity terminal of the DC power source. A voltage v is applied to the primary winding 35a of the transformer 35 with the negative polarity appearing at the dotted side, and a power is supplied to the load 16.

In order to make the inverter INV2 off at a time $t_4$, the base current b is cut off to turn the transistor 32 off. Then, a circuit of the positive polarity terminal of the above-mentioned DC power source 1→primary winding 35a of the transformer 35→transistor 32→negative polarity terminal of the DC power source 1 is opened and the power supply to the load 16 is stopped. At this time, since the stray capacitance 35c is charged with a polarity opposite to that shown in the figure, the base current c is made to flow at $t_4$ to turn the transistor 37 on. As a result, a closed circuit of the primary winding 35a of the transformer 35→diode 36d→transistor 37→diode 36a→primary winding 35a is formed. The electric charge in the stray capacitance 35c causes a damped oscillation as shown in FIG. 9 at v, and is discharged to zero.

As described above, in the above second embodiment, a circuit for short-circuiting the primary side of the transformer 35 is provided in parallel with the push-pull type inverter INV2. This circuit causes the residual electric charge in the high voltage transformer 35 to make a damped oscillation in the off-period of the inverter INV2. Therefore, such a voltage as shown by a broken line v of FIG. 3 is not applied to the transformer 22 in the off-period of the INV2. The product of applied voltage and time of the transformer 22 becomes constant and the transformer 22 can be made small and light.

A similar effect as mentioned above can be obtained if the short-circuiting circuit consisting of the above-mentioned full-wave rectifying circuit 36 and the transistor is provided on the secondary side of the transformer 35. Furthermore, this short-circuiting circuit can be applied to the push-pull type, full-bridge type or other types in the similar fashion as in the above embodiment with a similar effect.

This invention is especially useful for a case where the transformation ratio of the transformer is large and the secondary voltage is high, and the influence of the stray capacitance is large. When the secondary voltage is high, the above-mentioned short-circuiting circuit is provided on the primary side of the transformer.

As described above, according to this invention, since the transformer is made to be short-circuited in the off-period of the inverter, the product of applied voltage and time becomes constant. Thus, this invention is effective to make the transformer small and light.

For example, let us note an experimental result of an example of application to a high frequency inverter with an output of 2 kW, driving frequency of 200 Hz to 2 kHz, and inverter on-period of 200 μs. On the assumption that the magnetic flux density of iron core is 1 at the driving frequency of 2 kHz, the magnetic flux density becomes about 3.7 by a voltage applied in the inverter off-period at the driving frequency of 300 Hz. Therefore, it is necessary that the cross-section area of the iron core is selected such that the core does not magnetically saturate at the driving frequency of 300 Hz. According to this invention, since no voltage is applied to the high voltage transformer in the off-period of the inverter, the magnetic flux density of the iron core can be kept constant without regard to the driving frequency. Therefore, the cross-section area of the iron core may be selected such that the core does not magnetically saturate at the driving frequency of 2 kHz. According to this invention, the cross-section area of the iron core can be decreased by a factor of about 1/3.7 in comparison with a core without applying this invention. As a result, the size of the transformer can be made decreased to less than ½ and hence the weight can be decreased to approximately ¼.

We claim:

1. A method of controlling a full-bridge type inverter used in an inverter type switching power supply circuit including: a transformer having at least a primary winding and a secondary winding; a full-bridge type inverter for converting a DC power source to an AC voltage to be supplied to said primary winding, said inverter including a series circuit of a first switching element connected to a first polarity terminal of said DC power source and a second switching element connected to a second polarity terminal of said DC power source, first and second diodes connected in anti-parallel with said first and second switching elements of said series circuit, respectively, another series circuit of a third switching element connected to said first polarity terminal of said DC power source and a fourth switching element connected to said second polarity terminal of said DC power source, and third and fourth diodes connected in anti-parallel with said third and fourth switching elements of said another series circuit, respectively, and wherein one end of said primary winding is connected to the connecting point of said first and second switching elements and another end of said primary winding is connected to the connecting point of said third and fourth switching elements; rectifier means connected to said secondary winding for rectifying the output of said transformer; and smoothing capacitor means for smoothing the output of said rectifier means and supplying the smoothed output to a load; the method comprising:

a first step of turning on said first switching element and simultaneously turning off said second switching element, while said fourth switching element is maintained on and said third switching element is maintained off to provide an on-period;

a second step of, upon elapse of the on-period after initiation of said first step, turning off said first switching element and simultaneously turning on said second switching element, while maintaining said third and fourth switching elements in the off and on states, respectively, to provide an off-period;

a third step of, upon elapse of the off-period since initiation of said second step, turing off said fourth switching element and simultaneously turning on said third switching element, while maintaining said first and second switching element in the off and on states, respectively, to provide another on-period;

a fourth step of, upon elapse of the another on-period since initiation of said third step, turning on said fourth switching element and simultaneously turning off said third switching element, while maintaining said first and second elements in off and on states, respectively, to provide another off-period; and a fifth step of returning to said first step upon elapse of the another off-period since initiation of said fourth step and wherein the step of short-circuiting said transformer during the off-periods includes establishing two paths forming a bidirectional low-impedance path, one of said two paths being constituted by said primary winding, said second switching element and said fourth diode and the other of said two paths being constituted by said primary winding, said fourth switching element and said second diode, and maintaining on said second and fourth switching elements during the off-periods 2. A method according to claim 1, wherein the step of short-circuiting said transformer during the off-periods enables a damped oscillation of an electric charge stored in a stray capacitance of said transformer so as to discharge the electric charge stored in the stray capacitance of said transformer during the off periods.

3. A method according to claim 1, wherein the on-periods have a time length equal to a fixed predetermined value and the time lengths of said off-periods are variable.

4. A method according to claim 1, wherein the load includes an X-ray tube.

5. A switching power supply circuit using a full-bridge type inverter comprising:

a transformer having at least a primary winding and a secondary winding;

a full-bridge type inverter for converting a DC power source to an AC voltage to be supplied to said primary winding, said inverter including a series circuit of a first switching element connected to a first polarity terminal of said DC power source and a second switching element connected to a second polarity terminal of said DC power source, first and second diodes connected in anti-parallel with said first and second switching elements of said series circuit, respectively, another series circuit of a third switching element connected to said first polarity terminal of said DC power source and a fourth switching element connected to said second polarity terminal of said DC power source, and third and fourth diodes connected in anti-parallel with said third and fourth switching elements of said another series circuit, respectively, and wherein one end of said primary winding is connected to the connecting point of siad first and second switching elements and another end of said primary winding is connected to the connecting point of said third and fourth switching elements;

rectifier means connected to said secondary winding for rectifying the output of said transformer;

smoothing capacitor means for smoothing the output of said rectifier means and supplying the smoothed output to a load;

control means for controlling said inverter such that simultaneous turn-on of said first and fourth switching elements for an on-period and simultaneous turn-off of said third and second switching elements for said on-period are alternately repeated with an off-period inserted between the on-period and the next on-period; and short-circuit means for short-circuiting a stray capacitance of said transformer during said off-period so as to discharge an electric charge stored in said stray capacitance, said short-circuit means including a bidirectional low-impedance path means including two paths each of said two paths containing said primary winding, one of said first to fourth switching elements and one of said first to fourth diodes, said control means maintaining on said one of said first to fourth switching elements of each of said two paths during said off-period.

6. A switching power supply circuit according to claim 22, wherein one of said two paths is constituted of said primary winding, said second switching element and said fourth diode, and the other of said two paths is constituted of said primary winding, said fourth switching element and said second diode, said control means maintaining on said second and fourth switching elements during said off-period.

7. A switching power supply circuit according to claim 22, wherein said short-circuit means enables a damped oscillation of the electric change stored in said stray capacitance during said off-period so as to discharge the electric charge stored in said stray capacitance.

8. A power supply circuit according to claim 22, wherein said on-period has a predetermined fixed time length and a time length of said off-period is variable.

9. A power supply circuit according to claim 22, wherein said load is an X-ray tube.

* * * * *

UNITED STATES PATENT AND TRADEMARK OFFICE
CERTIFICATE OF CORRECTION

PATENT NO. : 4,737,974
DATED : Apr. 12, 1988
INVENTOR(S) : Hino et al.

It is certified that error appears in the above-identified patent and that said Letters Patent is hereby corrected as shown below:

IN THE TITLE PAGE:

Between line "[76] Inventors: Hirofumi Hino, 1708-1, Funado,"

and "[21] Appl. No.: 691,126" insert:

--Assignee: Hitachi Medical Corporation, Tokyo, Japan--

Signed and Sealed this

Seventeenth Day of January, 1989

Attest:

DONALD J. QUIGG

*Attesting Officer*      *Commissioner of Patents and Trademarks*